W. F. L. FISCH.
DOUGH ROOM MACHINE.
APPLICATION FILED AUG. 19, 1919.

1,365,676.

Patented Jan. 18, 1921.
2 SHEETS—SHEET 1.

Witness
C. E. Arundel

Inventor
W. F. L. Fisch.
By
[signature], Attorney

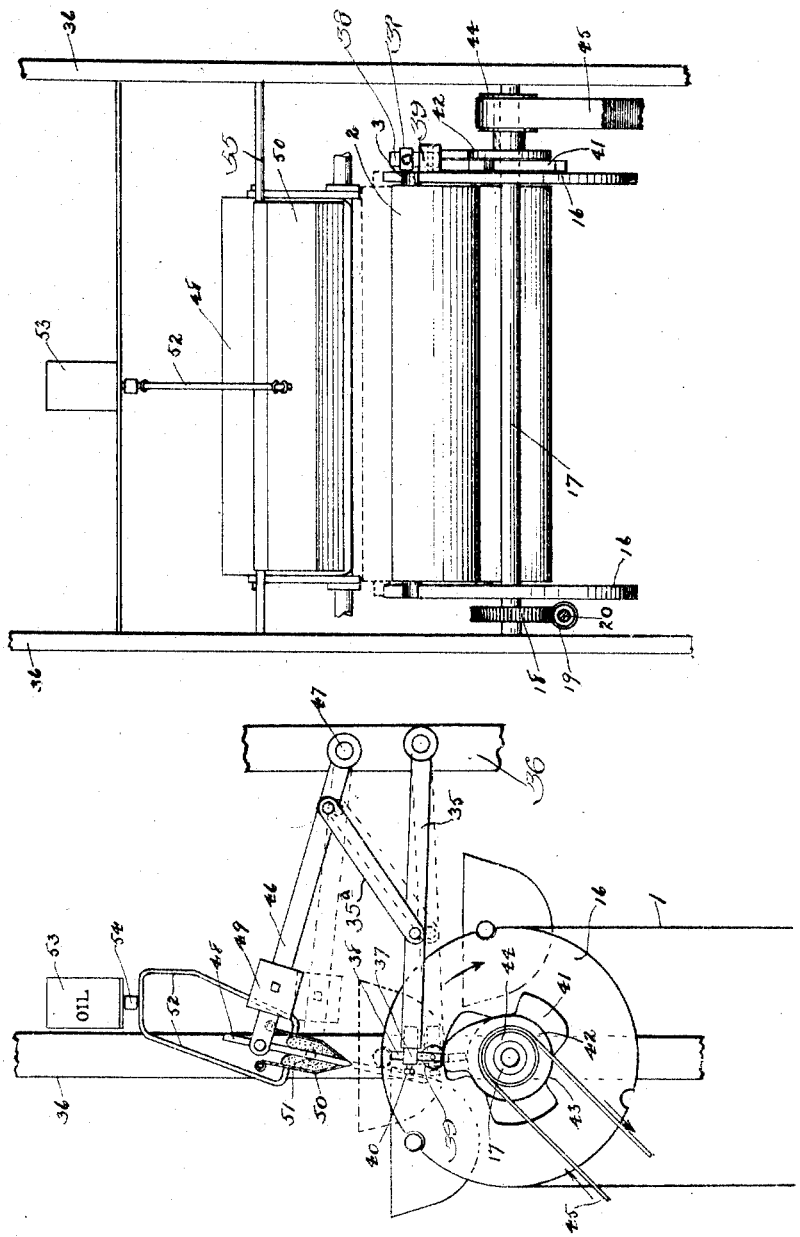

UNITED STATES PATENT OFFICE.

WILLIAM F. L. FISCH, OF BIRMINGHAM, ALABAMA.

DOUGH-ROOM MACHINE.

1,365,676.     Specification of Letters Patent.     Patented Jan. 18, 1921.

Application filed August 19, 1919. Serial No. 318,620.

*To all whom it may concern:*

Be it known that I, WILLIAM F. L. FISCH, a citizen of the United States of America, residing at Birmingham, in the county of Jefferson and State of Alabama, have invented certain new and useful Improvements in Dough-Room Machines, of which the following is a specification.

My invention relates to a dough room machine having for its object to convey and store the dough while in the process of fermentation and to automatically cut-over the dough at the desired times during its fermentation.

In making bread and especially in connection with the process known as the straight dough process, the dough is mixed with all of its ingredients and then dumped into long heavy troughs which occupy much space and in which it is allowed to ferment for about six hours, during which time the dough is cut-over about three times. This cutting over of the dough is accomplished by hand labor, the dough being punched down and folded together, and when the fermentation is complete the heavy troughs are moved by hand from the point of charge to the point of discharge. To obtain the best results it is necessary during this process to maintain the temperature throughout the dough room uniform, and it will be obvious that the cost of insulating the large room space required for the troughs will be high and that it will be expensive to heat the dough room and difficult to regulate and control the temperature in the manner desired for different doughs or different stages of fermentation.

With my present invention, the dough is handled and cut-over mechanically throughout its fermentation period, thus making the operation strictly sanitary; the dough troughs are kept moving on a conveyer having its flights so arranged as to reduce the room space required to a minimum; and the time interval to the first cut-over and if desired between the cutting-over operations can be varied within the necessary limits to suit different doughs.

My present invention comprises a novel means for adjusting the time interval between cutting-over operations and novel mechanism for automatically controlling the operation of the cut-over mechanism and the oiling thereof to prevent the adherence of the dough to the cutting blades.

My invention is illustrated in one embodiment thereof in the accompanying drawings, in which:—

Fig. 2 is an enlarged view partly in section of one of the cut-over mechanisms.

Fig. 3 is a front elevation of Fig. 2, with the conveyer chains broken away in front of the sprockets for the sake of clearness.

Similar reference numerals refer to similar parts throughout the drawings.

Figure 1:
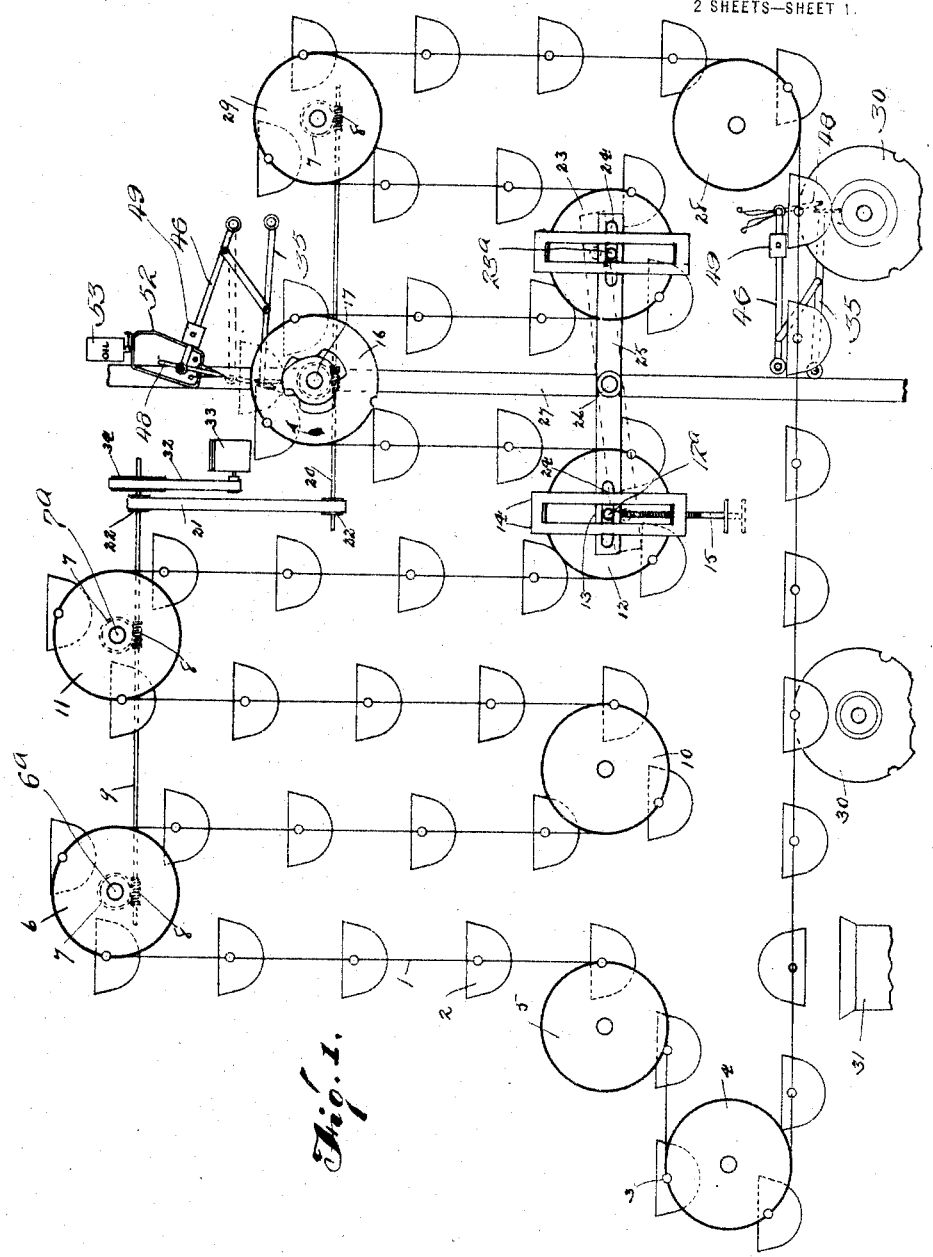
Figure 1 illustrates in side elevation my improved dough room appliance with the supporting frame work in part omitted for the sake of clearness.

In the foregoing embodiment of my invention illustrated in the drawings, I have purposely omitted from Fig. 1 the supporting frame work for the endless conveyer 1 carrying the dough troughs as such supporting frame work may be of any suitable character and such detail structure forms no part of my present invention. The endless conveyer is formed by two spaced conveyer chains of any suitable character. Trunnions 3 near the top of the troughs are journaled in the chains so as to permit the troughs to hang freely throughout the circuitous flight of the conveyer in the proofing room. The empty troughs pass about idler sprockets 4, one for each chain, and are there charged with their respective batches of dough to be proved and from these idler sprockets 4 the conveyer passes about a second double idler sprocket 5 traveling horizontally and thence travels vertically to a driven double sprocket 6 having a worm wheel 7 fast on the sprocket shaft 6ª driven by a worm 8 on the main power shaft 9. From the driving sprocket 6 the conveyer passes downwardly about a double idler sprocket 10 and thence leads vertically to a second double driving sprocket 11 having a worm wheel 7, fast on the shaft 7ª, driven by another worm 8 on the shaft 9. The conveyer thence passes about an adjustable double sprocket 12 having its shaft 12ª journaled in a bearing box 13 which is vertically adjustable in a stationary guide frame 14. The bearing box is adjusted to set positions by a screw 15 passing upwardly through the bottom of the guide frame. The conveyer passes from the sprocket 12 upwardly about a double sprocket 16 mounted on a shaft 17 driven by a worm wheel 18 which in turn is driven by a worm 19 on the shaft 20, which derives its power from the shaft 9 by a belt 21 and pulleys 22. After passing about the sprocket 16 the endless conveyer passes downwardly and about a second adjustable double sprocket 23 having its shaft 23ª loosely journaled in an elongated slot 24 at one end of an equalizing lever 25 which is pivoted at 26 to a frame member 27, the other end of the equalizer lever having a similar slot 24 which receives the shaft 12ª of the sprocket 12. By this arrangement as the sprocket 12 is lowered the sprocket 23 is proportionately raised (see dotted position of lever, Fig. 1) and vice versa, thus varying the length of the conveyer's flight between the sprocket 4 and the sprocket 16 where one cut over operation takes place, and between the latter sprocket and the sprocket 28 adjacent to which the second cut-over operation takes place. The conveyer in its flight from the sprocket 23 to a sprocket 28 passes upwardly about a double driving sprocket 29 having a worm wheel 7 driven by another worm 8 on the shaft 20. The conveyer passes from the sprocket 28 to the sprocket 4, being intermediately supported by several double idler sprockets 30, the latter of which is juxtaposed to the point where the troughs are dumped into the chute 31 by hand or by any suitable mechanism.

The shaft 9 is driven by a belt 32 leading from the driving pulley of the motor 33 to a pulley 34 on the shaft 9, and by this arrangement all of the overhead sprockets which carry the weight of the conveyer are power driven to insure a uniform and evenly balanced feed of the conveyer in its endless flight through the proofing room.

In Figs. 2 and 3 I illustrate in detail one of the cut-over mechanisms and the description of one will be sufficient for all that may be utilized in cutting-over the dough while it is being proofed. This mechanism comprises a lever 35 suitably journaled in the frame form 36 at one side of the conveyer and provided with a socket bearing 37 at its free end which has a vertical hole therethrough to receive a shank 38. A set screw 40 holds the shank in position to rest upon a pair of rotatable cams 41 and 42. The cam 41 is fast on the shaft 17 which is driven along with the conveyer in the manner already described at a very slow speed by means of the worm wheel 18 and worm 19, and this cam comprises a plurality of deep depressions or notches 43 which drop down to the surface level of the main body portion of the cam 42 which is annular except for a single abrupt cam projection or shoulder rising from its periphery. The cam 42 is fast on a pulley 44 which is driven by a belt or chain 45 from any suitable source of power such as a separate motor or a motion transmission means deriving its power from the motor 33. The rate at which the cam 42 is driven is such in relation to the rotation of the cam 41 that it will have three or more complete rotations while the cam 41 is moving a notch 43 therein out of engagement with the roller 39. It will be observed that the notches 43 are arranged to come opposite the troughs as they move with the wheel 16 so that a notch will always travel in radial alinement with the axis of its respective trough as it travels about the sprocket wheel. The width of the notch is such as to permit the roller to drop therein just after the approaching edge of the trough assumes position under the cut-over mechanism and to raise the roller and arm out of the notch just before the trough moves out from the cut-over mechanism. Due to the higher relative speed of rotation of the cam 42 the latter will engage the roller and move arm 35 a number of times raising it from and dropping it back into the notch 43, the number of times that this occurs under the cut-over mechanism being determined by the ratio of speeds of the cams 41 and 42.

The cut-over mechanism proper comprises oscillatory arms 46 journaled at 47 to the frame 36 and at their free ends pivotally connected to the upper ends of a cut-over blade 48. Adjacent weights 49 on arms 46 serve to drive the blade in the desired manner into the dough, and links 35ª connect the arms 35 and 46 so that as the arms 35 are raised by the cams they lift the arms 46 with them. The cut-over blade is nearly as long as the trough and as it oscillates it slides between and is guided by stripper plates 50, one on each side, which are preferably of spring metal made fast at their upper edges to cross shafts 55 and at their lower edges adapted to strip any dough adhering to the cut-over blade as it rises from the trough. To keep the blade clean I provide oiling pads 51 carried on the inside of the stripping plates 50 and adapted to receive the cut-over blade between them and keep its surface oiled. These pads are supplied with oil by pipes 52 which lead from an overhead oil tank 53 suitably mounted on the frame work 36. A valve 54 controls the flow of oil to the pads.

In operation, having loaded the dough into the troughs as they round the sprocket 4, the endless conveyer moves the troughs slowly through the proofing room consuming the desired length of time in the flight before reaching the first cut-over mechanism at the sprocket 16. As each trough approaches the upper portion of the sprocket 16 the radially alining notches 43 in the cam 41 will pass under the roller 39 thus freeing the arm 35 to fall subject to the control of the rapidly rotating cam 42, which cam during the passage of the trough under the cut-over mechanism will raise and lower the lever 35 a predetermined number of times and with it will cause the cut-over blade to be raised and forced downwardly into the dough so as to cut it the desired number of times during its passage under the blade. The length of time consumed in the flight of the conveyer from the initial point to the first cut-over mechanism and from the first cut-over mechanism to the second cut-over mechanism can be adjusted by the relative movement of the idler sprockets 12 and 23, it being possible to displace these for several feet vertically and as this represents a double distance in the length of the conveyer and as the movement of the latter is very slow, it will be seen that I thus provide means for varying the time approximately half an hour which is ample for taking care of different grades of dough and different operating conditions in the proofing room. As many cut-over operations as desired may be provided.

This invention is not intended to be restricted in scope to the specific embodiments shown, but contemplates such modifications as come within the spirit and scope of the claims.

Having thus described my invention, what I claim as new and desire to secure by Letters Patent, is:—

1. In a dough handling apparatus, a moving conveyer, a cut-over mechanism for the dough substantially spaced from the point where the dough is delivered to the conveyer, and means independent of the speed of travel of the conveyer for varying the time in transit of the dough to the cut-over mechanism.

2. In a dough room apparatus of the character described, an endless conveyer carrying dough troughs, mechanisms for transferring and cutting over the dough at different points in its travel, and adjustable means to vary the length of the conveyer between its dough receiving point and the first of said cut-over mechanisms.

3. In a dough room apparatus of the character described, an endless conveyer carrying dough troughs, means to guide said conveyer in a zigzag course through different levels, means for cutting over the doughs at different points in the conveyer's travel, and adjustable means to vary the length of the conveyer between its dough receiving point and the first of said cut-over mechanisms, substantially as described.

4. In an apparatus of the character described, an endless conveyer carrying dough troughs, guides to direct the conveyer in a circuitous course, dough cut-over mechanisms arranged at spaced intervals along the path of said conveyer, and means controlled by the conveyer to drive said cut-over mechanisms for a predetermined interval sufficient to cut-over each passing batch of dough.

5. In an apparatus of the character described, a conveyer carrying dough troughs and a cut-over mechanism in the path of the conveyer, comprising a cutting blade, means to oscillate the same, and means movable with the conveyer for automatically interrupting the oscillation of the blade when the troughs are out of register therewith.

6. In an apparatus of the character described, a conveyer carrying dough troughs and a cut-over mechanism for the dough in the troughs comprising a cutting blade, a rapidly rotating cam means for oscillating the blade, and a master cam movable with the conveyer and adapted to interrupt the oscillations of the blade when the troughs are out of register therewith.

7. In an apparatus of the character described, an endless conveyer carrying dough troughs, means to drive the conveyer slowly, sprocket wheels about which the conveyer passes, a master cam rotatable with a sprocket and having controller surfaces which travel in radial alinement with the passing troughs, a rapidly rotating cam, and an oscillatory cut-over mechanism controlled by the joint action of said cams, substantially as described.

8. In an apparatus of the character described, an endles conveyer carrying dough troughs, means to drive the conveyer slowly, sprocket wheels about which the conveyer passes, a master cam rotatable with a sprocket and having controller surfaces which travel in radial alinement with the passing troughs, a rapidly rotating cam, a cut-over mechanism comprising an oscillatory arm, a roller thereon disposed to engage both of said cams, and a counterweighted cutting blade operably controlled by said arm.

9. In an apparatus of the character described, in combination, a cut-over mechanism and means to successively present batches of dough to said mechanism to be cut-over, said cut-over mechanism comprising an oscillatory cut-over blade, scrapers engaging the opposite faces of said blade, and means to oscillate the blade, substantially as described.

10. In an apparatus of the character described, in combination, a cut-over mechanism and means to successively present batches of dough to said mechanism to be cut-over, said cut-over mechanism comprising an oscillatory cut-over blade, spring scraper blades adapted to yieldingly engage the opposite faces of said cut-over blade, and means to oscillate the blade, substantially as described.

11. In an apparatus of the character described, in combination, a cut-over mechanism and means to successively present batches of dough to said mechanism to be cut-over, said cut-over mechanism comprising an oscillatory cut-over blade, oiling pads between which the blade stands in retracted position, and means to advance the blade from its retracted position to cut-over the passing dough.

12. In an apparatus of the character described, in combination, a cut-over mechanism, and means to successively present batches of dough to said mechanism to be cut-over, said cut-over mechanism comprising a vertically reciprocable cutting blade, scrapers engaging the opposite faces of the cutting blade, oiling pads held in blade engaging position by said scrapers, and means to oscillate the blade between said scrapers to cut-over the passing dough, substantially as described.

13. In an apparatus of the character described, an endless conveyer, dough troughs pivotally suspended therefrom, sprocket wheels arranged to guide the conveyer in a circuitous course, cut-over mechanism in the path of said conveyer adapted to cut-over the passing dough, movable sprockets for the conveyer on each side of a cut-over mechanism, and means to reversely adjust said sprockets comprising an equalizing agency, as and for the purposes described.

14. In an apparatus of the character described, an endless conveyer, dough troughs pivotally suspended therefrom, sprocket wheels arranged to guide the conveyer in a circuitous course, cut-over mechanisms in the path of said conveyer adapted to cut-over the passing dough, movable sprockets for the conveyer on each side of the first cut-over mechanism, means to reversely adjust said sprockets comprising an equalizing agency, said agency consisting of a pivoted arm having a lost-motion connection at its ends to the adjustable sprockets, and means to hold said arm in set position, substantially as described.

15. In an apparatus of the character described, the combination of an endless conveyer, dough troughs suspended from said conveyer, sprockets arranged to give the conveyer a circuitous course, a cut-over mechanism comprising a cutting blade, pivoted counter-weighted arms carrying said blade, a cam controlled lever to oscillate the said arms, a pair of cams for operating said lever comprising one cam movable with the sprocket wheel and notched in radial alinement with the passing troughs, and an independent cam concentric with the first mentioned cam and having the major portion of its circumference disposed to travel in a circumferential plane coincident with that of the bottom of the notches in said first mentioned cam and having a raised projection, and means to drive said latter cam at a higher rate of speed than the first mentioned cam.

In testimony whereof I affix my signature.

WILLIAM F. L. FISCH.

Witness:
  NOMIE WELSH.